(12) United States Patent
Aldraihem et al.

(10) Patent No.: US 12,127,491 B1
(45) Date of Patent: Oct. 29, 2024

(54) SHOVEL

(71) Applicant: KING SAUD UNIVERSITY, Riyadh (SA)

(72) Inventors: Osama Jasem Aldraihem, Riyadh (SA); Meshal Abdullah Alajaji, Riyadh (SA); Yazeed Khalid Alsalim, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/658,921

(22) Filed: May 8, 2024

(51) Int. Cl.
*A01B 1/02* (2006.01)

(52) U.S. Cl.
CPC .................................. *A01B 1/024* (2013.01)

(58) Field of Classification Search
CPC ........... A01B 1/02; A01B 1/022; A01B 1/024; B25F 1/006
See application file for complete search history.

(56) References Cited

U.S. PATENT DOCUMENTS

| | | | |
|---|---|---|---|
| 1,530,225 A | 3/1925 | Steven | |
| 3,993,340 A * | 11/1976 | Rusing | A01B 1/022 294/51 |
| 4,730,860 A * | 3/1988 | Padgett | A01B 1/02 294/49 |
| 5,865,490 A | 2/1999 | Vowell | |
| 5,887,920 A * | 3/1999 | Perciful | A01B 1/02 294/60 |
| 7,117,954 B2 * | 10/2006 | Vipond | A01B 1/16 111/101 |
| 7,320,490 B2 | 1/2008 | Yakimchuk | |
| 7,325,625 B1 | 2/2008 | Winters | |
| 9,198,337 B2 | 12/2015 | Walsh et al. | |

FOREIGN PATENT DOCUMENTS

| | | |
|---|---|---|
| GB | 561688 A | 5/1944 |
| GB | 2472045 A | 1/2011 |

OTHER PUBLICATIONS

Product: Mighty Power Shovel (Bernini Adjustable 42" Mighty Power Shovel on QVC).

* cited by examiner

*Primary Examiner* — Dean J Kramer
(74) *Attorney, Agent, or Firm* — Nath, Goldberg & Meyer; Joshua B. Goldberg

(57) ABSTRACT

A shovel includes a handgrip and a shaft. The shaft has a proximal end and a distal end, the handgrip is attached to the shaft at the proximal end. The shovel includes an attachment mechanism attached to the shaft at the distal end. The attachment mechanism includes: a housing having an upper portion and a lower portion; and a triggering mechanism located within the housing. The triggering mechanism includes: a hammer spring and a hammer located in the upper portion of the housing, the top portion of the hammer abutting the hammer spring, and the bottom portion of the hammer including a recess. The triggering mechanism also includes a punch pin located in the bottom portion of the housing, the top of the punch pin contacting the bottom of the hammer adjacent to the recess. The triggering mechanism further includes a punch pin spring coiled around the punch pin.

5 Claims, 7 Drawing Sheets

SHOVEL

BACKGROUND

1. Field

The present disclosure relates to a shovel, in particular a shovel with an attachment mechanism that imparts force on soil and reduces the effort and stress on a user.

2. Description of the Related Art

The shovel is a simple tool that has played a vital role in human's life for centuries. The uses of the shovel vary widely, as it is very versatile in terms of the tasks it performs. Some of the tasks a shovel can perform include digging, lifting, scraping, and moving materials. The shovel can be composed of many types of material, like sheet steel, hard plastics, bronze, and wood. Moreover, shovels have played pivotal role in numerous aspects of human life, which can be include in construction jobs, agriculture, mining, and war. In construction jobs, shovels are used for digging foundations, trenches, and other types of holes. In agriculture, shovels are used for tasks like tending soil, planting seeds, and harvesting crops. In mining, shovels are used to move and dig large amounts of earth and rock, while in wars, shovels have been used as weapons and as tools for digging trenches and bastion. Shovels have also played a significant role in the history of transportation, with early brume shovels being used to dig canals and roads. Until this day, shovels are still helping transportation in constructing structures, like bridges and roads.

In general, a conventional hand shovel is an easily manufactured basic tool. However, a shovel can inflict a lot of stress on the user's body and tends to consume a lot of energy, effort, and time in digging through tough soil, which could affect the user's health and the working rate remarkably. Moreover, people with less strength have difficulties using this tool.

SUMMARY

There is, therefore, a need for a novel shovel that addresses the disadvantages of the prior art shovels. In particular, the present subject matter is directed to a shovel that allows the user to dig through tough soil (up to 2600 kg/m$^3$) and to reduce the time it takes to dig through the tough soil with less exerted effort. In accomplishing these goals, the shovel of the present subject matter reduces the probability of long-term injuries using the shovel while digging through tough soil. This is accomplished by employing a mechanical mechanism that does not rely on electricity and is a stable solution that is helps prevent direct injuries from use of the shovel.

In one embodiment of the present subject matter, a shovel includes a handgrip and a shaft. The shaft has a proximal end and a distal end, the handgrip is attached to the shaft at the proximal end. The shovel includes an attachment mechanism attached to the shaft at the distal end. A foot pedal and a blade are attached to the attachment mechanism. The blade has a blade tip and a blade end.

In some embodiments, the attachment mechanism includes: a housing having an upper portion and a lower portion; and a triggering mechanism located within the housing. The triggering mechanism includes: a hammer spring located in the upper portion of the housing; a hammer having a top portion and a bottom portion, wherein the hammer is located in the upper portion of the housing, the top portion of the hammer abuts the hammer spring, and the bottom portion of the hammer includes a recess. The triggering mechanism also includes a punch pin having a top and a bottom, wherein the punch pin is located in the bottom portion of the housing, the top of the punch pin contacts the bottom of the hammer adjacent to the recess, and the bottom of the punch pin contacts the blade tip. The triggering mechanism further includes a punch pin spring, wherein the punch pin spring is coiled around the punch pin. A return spring is located outside of the lower portion of the housing.

Another embodiment of the present disclosure is directed to a shovel. The shovel includes a handgrip and a shaft having a proximal end and a distal end with the handgrip being attached to the shaft at the proximal end. The shovel also includes an attachment mechanism attached to the shaft at the distal end, a foot pedal attached to the attachment mechanism, and a blade attached to the attachment mechanism. The blade includes a blade tip and a blade end.

In some embodiments, the attachment mechanism includes: a housing; a triggering mechanism guide located within the housing and comprising a plurality of triggering mechanism holes; a triggering mechanism plate located within the housing and in contact with the blade tip; and a plurality of triggering mechanisms located within the housing and in the triggering mechanism holes of the triggering mechanism guide. Each of the plurality of triggering mechanisms includes: a triggering mechanism housing having an upper portion and a lower portion; a hammer spring located in the upper portion of the triggering mechanism housing; a hammer having a top portion and a bottom portion, wherein the hammer is located in the upper portion of the triggering mechanism housing, the top portion of the hammer abuts the hammer spring, and the bottom portion of the hammer includes a recess. The triggering mechanism can include a punch pin having a top and a bottom, wherein the punch pin is located in the bottom portion of the triggering mechanism housing, the top of the punch pin contacts the bottom of the hammer adjacent to the recess, and the bottom of the punch pin contacts the triggering mechanism plate; and a punch pin spring, wherein the punch pin spring is coiled around the punch pin.

BRIEF DESCRIPTION OF THE DRAWINGS

FIG. 6A shows the attachment mechanism with the housing, while FIG. 6B shows the attachment mechanism without the housing.

Similar reference characters denote corresponding features consistently throughout the attached drawings.

DETAILED DESCRIPTION OF THE PREFERRED EMBODIMENTS

A shovel is a simple tool that aids a user in moving material, whether by digging a hole, scraping material from a surface, or transporting material from one location to another. A shovel generally includes three components: a hand grip, a handle, and a blade. The three pieces are commonly joined together.

The hand grip is an important aspect of the shovel when using the shovel. A comfortable and secure grip can reduce fatigue and increase efficiency while the user is digging with the shovel. The grip can be made of a material that provides a non-slip surface, with non-limiting examples being rubber or plastic. The grip is designed to fit comfortably in the user's hand. The grip can be ergonomically contoured to the shape of the user's hand for added comfort. The grip is firmly attached to the handle, as a grip that is loosely attached to the handle can lead to lack of control of the shovel and potential injury to the user.

The handle includes an elongated shaft and connects the hand grip to the blade or tool head. It is on the handle that the user can grasp and control the shovel. Many shovels and other hand tools have a ledge or step where the shaft connects to the tool head, with the ledge or step providing the user a place on which to stand or step to exert more force or leverage when using the shovel. The elongated shaft is usually not adjustable for use by users of differing heights.

The third component of a shovel is the blade (or tool head). The blade is made of a rigid material, such as metal or hard plastic. The rigidity of the blade aids in breaking through soil when using the shovel to dig a hole. If the shovel's primary purpose is to move material from one location to another, it is contemplated that the blade is larger in area and made of a more lightweight plastic or metal material.

Figure 1:
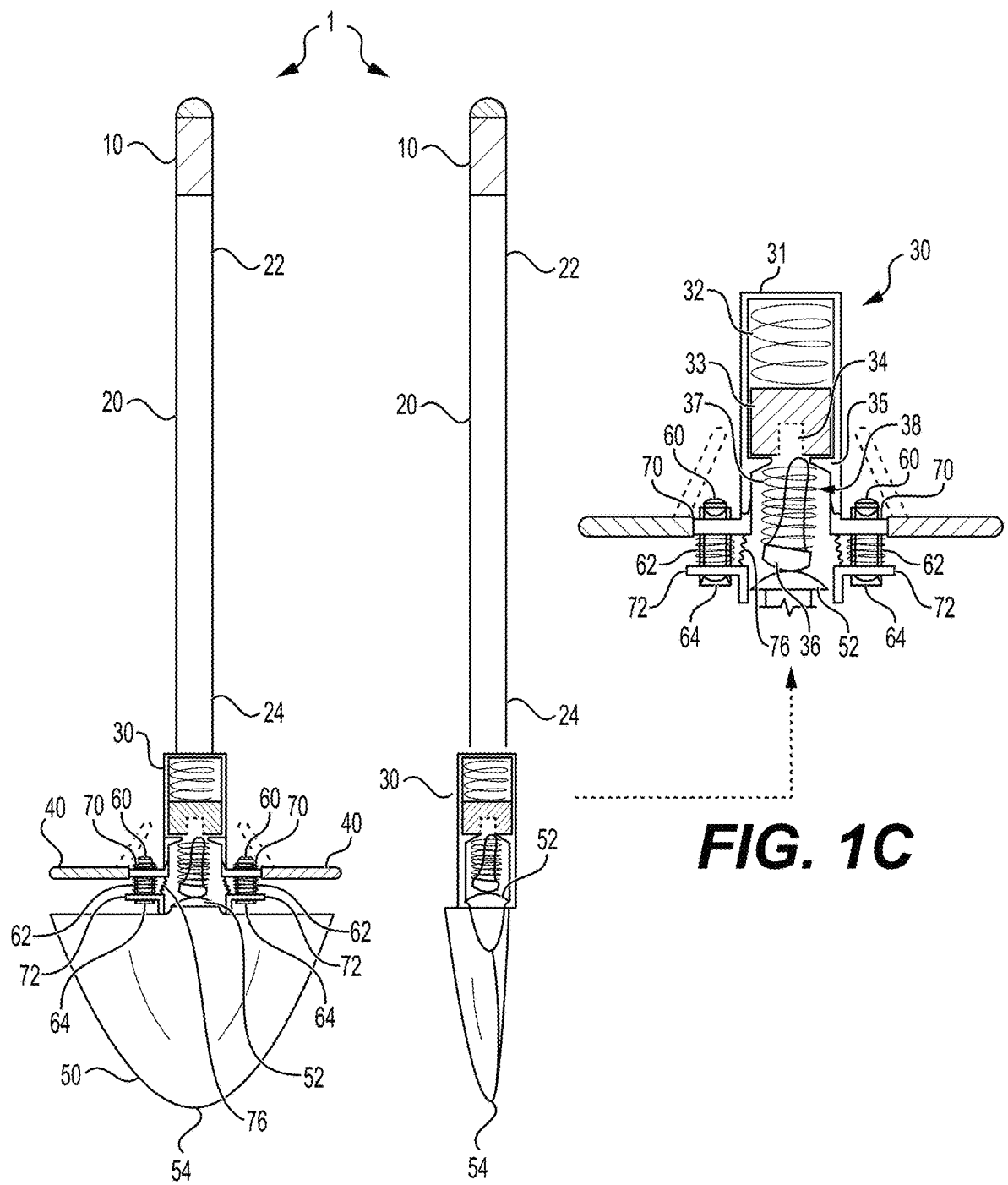
FIGS. 1A and 1B are front and side views of an embodiment of a shovel in accordance with the present subject matter, respectively.
FIG. 1C is an enlarged view of the attachment mechanism to highlight the details thereof.

A non-limiting embodiment of a shovel of the present subject matter is shown in FIGS. 1A-1B. FIG. 1A is a front view of shovel 1, while FIG. 1B is a side view of shovel 1. As seen in FIGS. 1A and 1B, shovel 1 includes handgrip 10, shaft or handle shaft 20, attachment mechanism or attachment structure 30, and blade 50. As used herein, "attachment mechanism" and "attachment structure" are used interchangeably. Shaft 20 has a proximal end 22 and a distal end 24. Handgrip 10 is attached to shaft 20 at proximal end 22 and attachment mechanism 30 is attached to shaft 20 at distal end 24. Attachment mechanism 30 attaches blade 50 to shaft 20. Blade 50 includes blade tip 52 on a first end of blade 50 and a blade end 54 on a second end of blade 50, the first end of blade 50 opposite the second end of blade 50. The shape of blade end 54 can be any conventional shape used with shovels, including parabolic or rectangular. Blade end 54 is depicted in FIGS. 1A and 1B with a parabolic shape.

FIGS. 1A and 1B also depict shovel 1 as including foot pedal 40 attached to attachment mechanism 30 at a bottom thereof. Foot pedal 40 allows a user to exert a force on shovel 1, with such force and action on blade 50 being further described with respect to FIGS. 2A-2D below. It is contemplated that foot pedal 40 is moveable between an open position and a closed position. The embodiment shown in FIGS. 1A and 1B shows foot pedal 40 in the open position through the use of the solid lines, while foot pedal 40 is shown in the closed position by the dashed lines.

FIG. 1C is an enlarged view of attachment mechanism 30. As can be seen in FIG. 1C, attachment mechanism 30 includes housing 31 which houses trigger mechanism 38. Trigger mechanism 38 includes hammer spring 32 and hammer 33. Hammer spring 32 is located in an upper portion of housing 31. Hammer spring 32 is configurable between an expanded position and a compressed position. Hammer spring 32 is shown in FIG. 1C in the expanded position.

Hammer 33 is located in the upper portion of housing 31 below hammer spring 32. Hammer 33 has a top portion which abuts hammer spring 32 and a bottom portion located opposite the top portion. Hammer 33 includes recess 34 located in the bottom portion. Hammer 33 rests on an annular ledge 35 which is an integral part of housing 31. Ledge 35 divides housing 31 into the upper portion and a lower portion.

Trigger mechanism 38 further includes punch pin 36 and punch pin spring 37. Punch pin 36 and punch spring 37 are located in the lower portion of housing 31. Punch spring 37 is coiled around punch pin 36 and is configured between an expanded position and a compressed position. Punch pin spring 37 is shown in FIG. 1C in its expanded position. A top of punch pin 36 contacts the bottom portion of hammer 33 close to or adjacent recess 34. A bottom of punch pin 36 contacts blade tip 52, which projects into housing 31.

In addition, attachment flanges 70 are welded to attachment mechanism 30. Attachment flanges 70 are pin connected with foot pedal 40. Further, blade flanges 72 are attached to (for example, by welding) to blade 50. Attachment flanges 70 and blade flanges 72 are connected by way of bolts 60 and nuts 64. Bolts 60 and nuts 64 are attached through return spring 62 to provide a return motion of the components. In a particular embodiment, a flexible hose 76 covers the exposed portions of the attachment mechanism 30 to protect from dust and other contaminants. As can be seen in FIG. 1C, return spring 62 is mounted outside of the lower portion of housing 31.

Handgrip 10 is any suitable shape. Non-limiting examples of shapes that the handgrip 10 can be include D-shaped or straight. Likewise, shaft 20 is made of any suitable material. Non-limiting examples of suitable shaft materials include wood or fiberglass. Whether made of wood or fiberglass, the shaft 20 can also be made of solid material or can be hollow. Further, non-limiting examples of types of wood usable for shaft 20 include ash, elm, red oak, and white oak.

FIGS. 2A-2D depict use of the shovel of the present inventive subject matter. For ease of understanding, the details of only attachment mechanism 30, foot pedals 40 and blade 50 are shown. In FIGS. 2A-2D, foot pedals 40 are shown in the open position.

Figure 2:
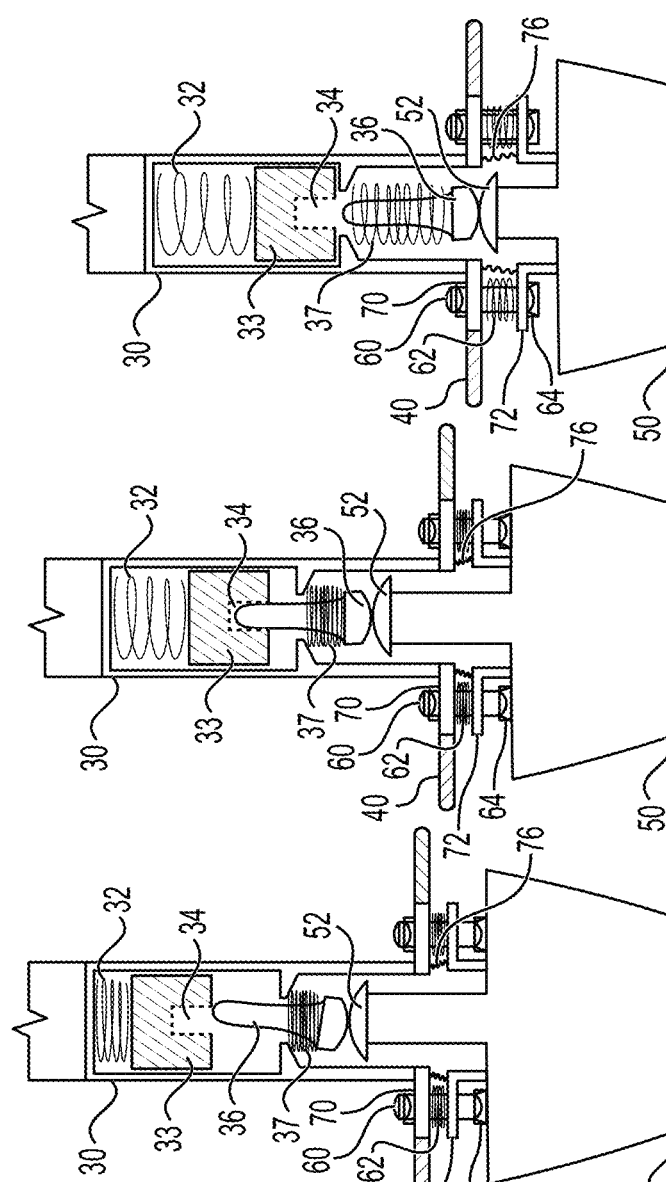
FIGS. 2A, 2B, 2C, and 2D depict how the shovel shown in FIG. 1A is used when engaging the ground.

In operation, the shovel is positioned on the ground and a user applies force on foot pedals 40 as shown in FIG. 2A. This force moves attachment mechanism 30 in a downward direction, causing punch pin spring 37 to compress and hammer spring 32 to compress as depicted in FIG. 2B. Punch pin spring 37 and hammer spring 32 compress because of the action of blade tip 52 on punch pin 36 and hammer 33 (the action on hammer 33 being via punch pin 36). Upon compression of hammer spring 32 and punch pin spring 37, the top of punch pin 36 slides into recess 34 of hammer 33, thus expanding hammer spring 32. This is depicted in FIG. 2C. The expansion of hammer spring 32 slightly forces blade 50 further into the ground. After punch pin 36 is seated in recess 34, punch pin spring 37 is expanded, forcing punch pin 36 in a downward direction to act on blade tip 52, thereby forcing blade further into the ground, as shown in FIG. 2D. After this, the components of the trigger mechanism return to their initial state, as shown in FIG. 2A, aided by return spring 62.

It is contemplated that the actions shown and described in FIGS. 2A-2D are instantaneous in nature, whereby once a user applies force to foot pedals 40, the actions take place immediately so that there is no delay in having blade 50 act on the ground. In other words, once a user applies the force, the springs are compressed, the pin is moved into the recess, and the springs are expanded without any delay between the actions.

Figure 3:
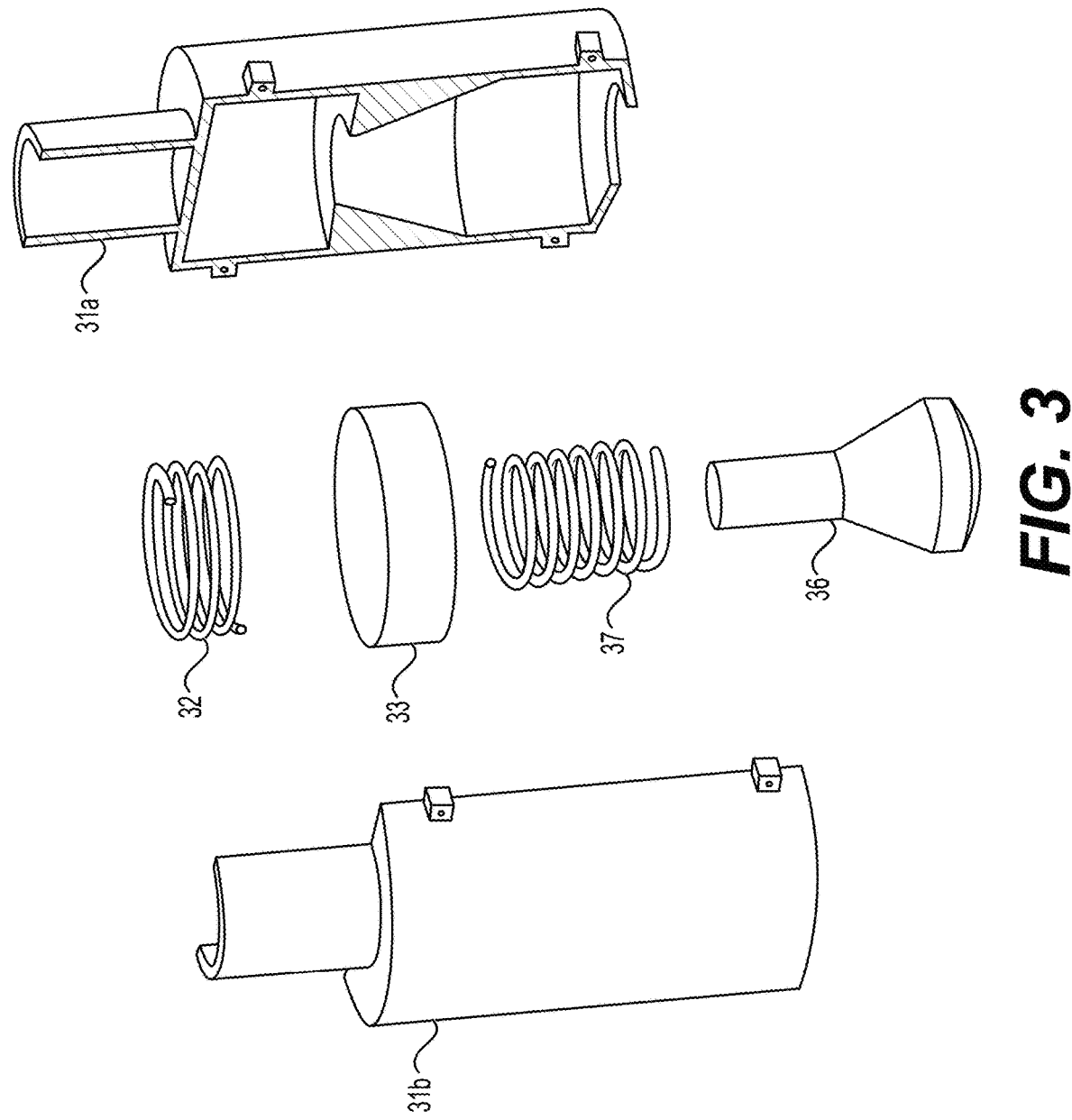
FIG. 3 depicts an exploded view of an attachment mechanism having a two-piece housing.

In some embodiments, housing 31 is a two-piece house whereby the trigger mechanism components are located in the housing and the two pieces are attached by bolts and/or fasteners. FIG. 3 is a depiction of an attachment mechanism with housing being depicted in two parts, 31a and 31b, respectively. 31a and 31b are brought into contact with each other with the shown trigger mechanism components therein.

Figure 4:
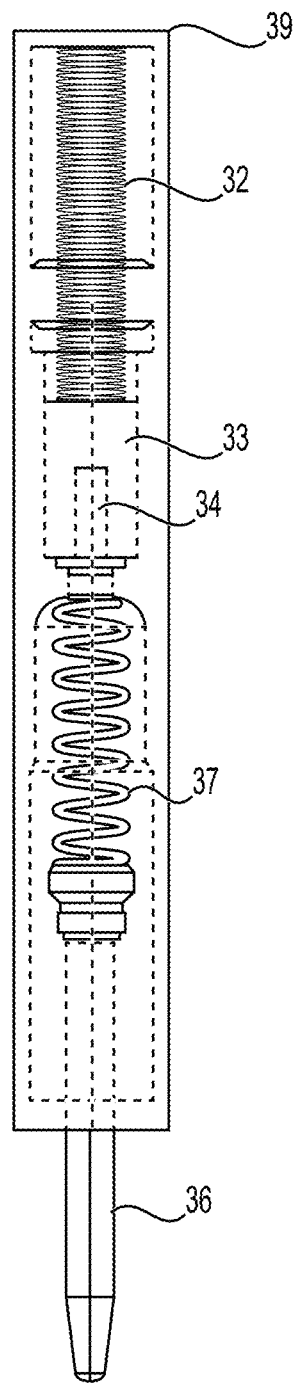
FIG. 4 depicts an embodiment of an trigger mechanism having a one-piece cylindrical housing.

In other embodiments, attachment mechanism 30 includes a plurality of trigger mechanisms within a single housing. In these embodiments, each trigger mechanism has a trigger mechanism housing 39, which is in the form of a one-piece cylinder. FIG. 4 depicts a non-limiting alternative example of such a trigger mechanism having a trigger mechanism housing 39 in a one-piece cylindrical shape. In the embodiment of FIG. 4, trigger mechanism housing 39 houses hammer spring 32, hammer 33, punch pin spring 37 and punch pin 36. It is also contemplated that other details of each trigger mechanism are similar to the trigger mechanism described above. In particular, hammer spring 32 and hammer 33 are located in an upper portion of trigger mechanism housing 39, while punch pin spring 37 and punch pin 36 are located in a bottom portion of trigger mechanism housing 39. Hammer 33 is located below hammer spring 32. Hammer 33 has a top portion which abuts hammer spring 32 and a bottom portion located opposite the top portion. Hammer 33 includes recess 34 located in the bottom portion.

Each trigger mechanism 38 further includes punch pin 36 and punch pin spring 37. Punch pin 36 and punch spring 37 are located in the lower portion of trigger mechanism housing 39. Punch spring 37 is coiled around punch pin 36 and is configured between an expanded position and a compressed position. A top of punch pin 36 contacts the bottom portion of hammer 33 close to or adjacent the recess. A bottom of punch pin 36 contacts triggering mechanism plate 71.

Figure 5:
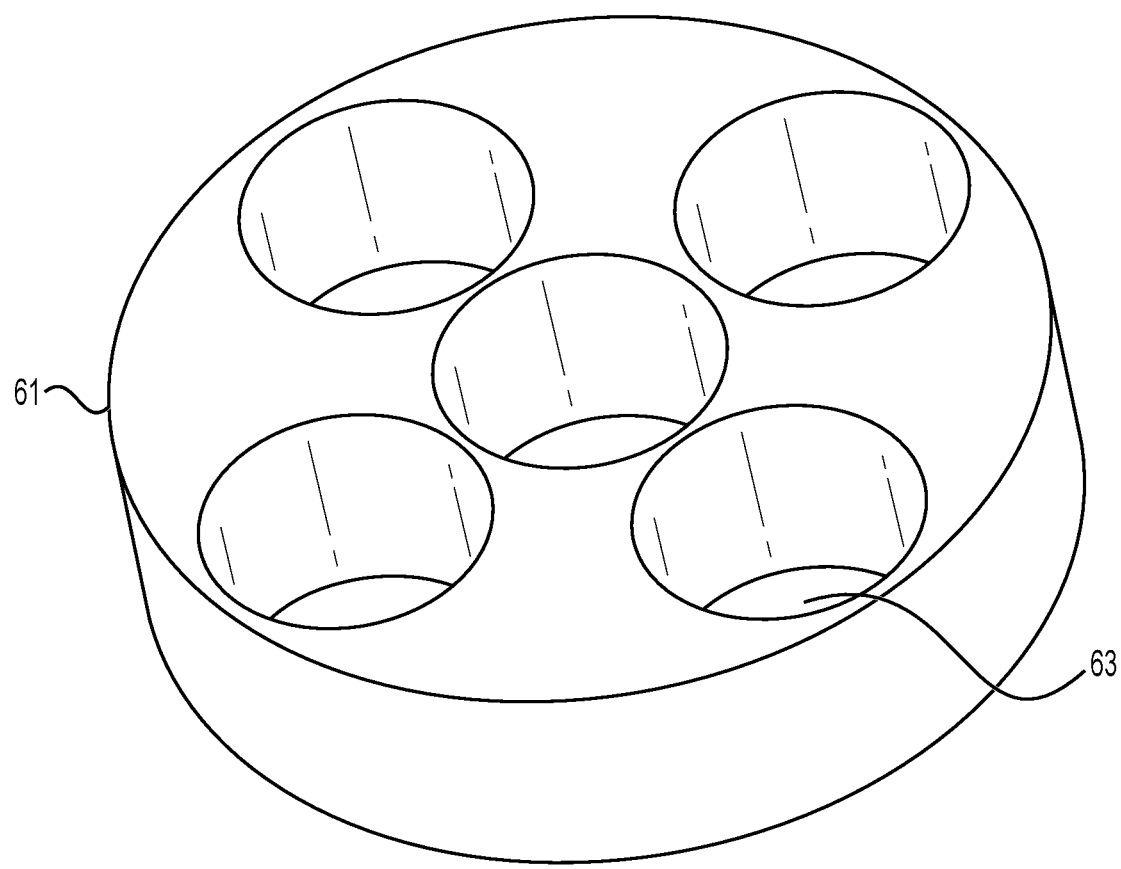
FIG. 5 depicts a trigger guide mechanism in accordance with an embodiment of the present disclosure.

In those embodiments in which a plurality of trigger mechanisms are used within a single attachment mechanism, a trigger mechanism guide is used within the attachment mechanism housing to help align and position each trigger mechanism. FIG. 5 depicts such a trigger mechanism guide 61. As can be seen, triggering mechanism guide includes a plurality of triggering mechanism holes 63 which receive the plurality of triggering mechanisms.

Figure 6A:
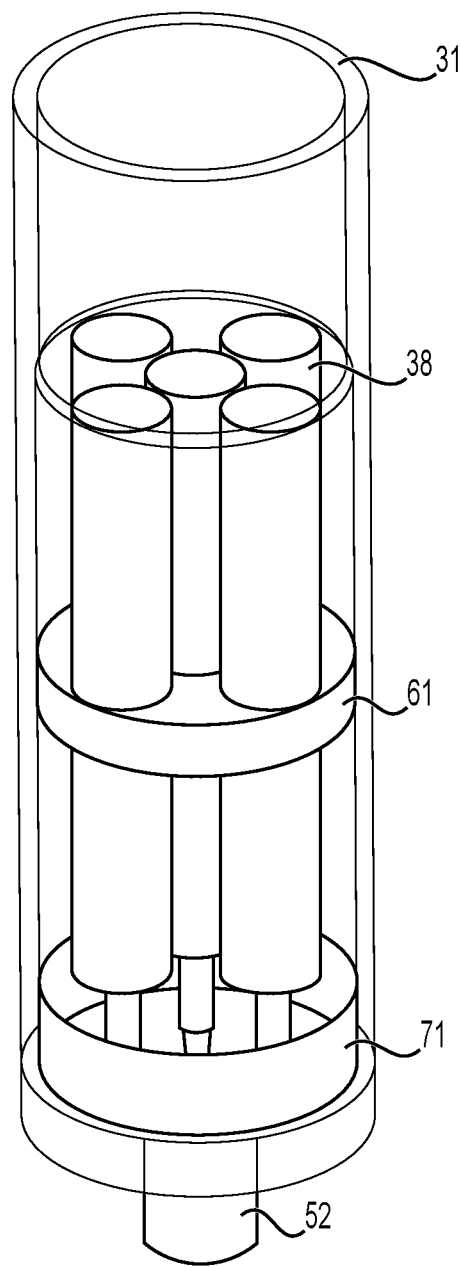
FIGS. 6A and 6B depict an embodiment of an attachment mechanism showing multiple trigger mechanisms.
Figure 6B:
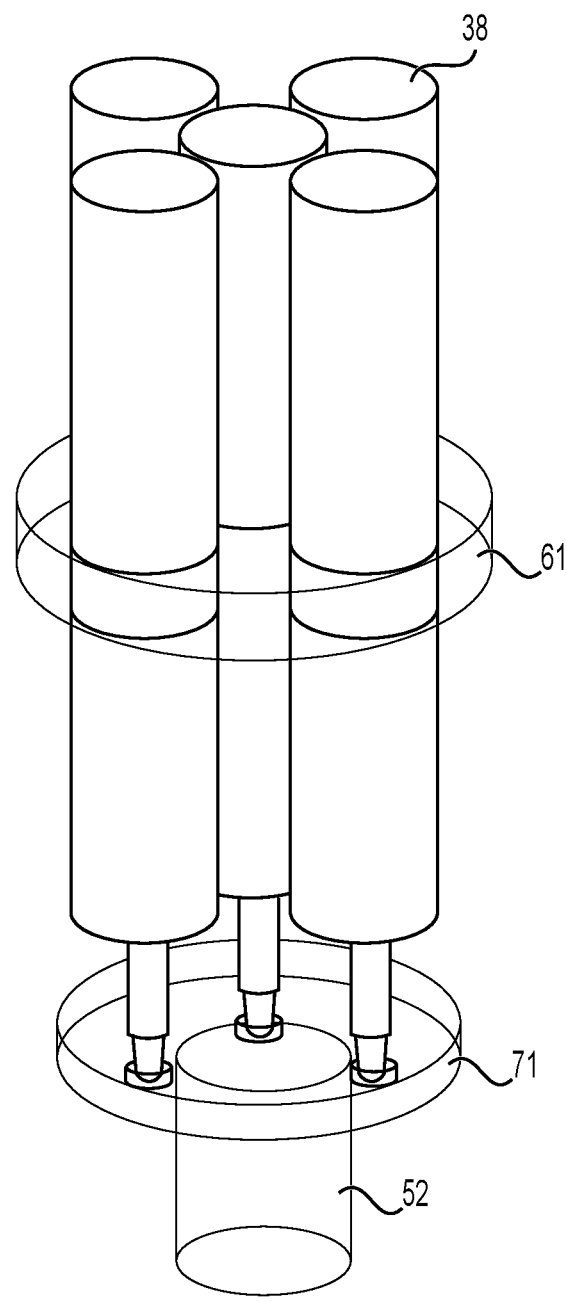

Likewise, FIGS. 6A and 6B depict attachment mechanism 30 having a plurality of trigger mechanisms 38. FIG. 6A depicts attachment mechanism 30 including housing 31 and trigger mechanism guide 61, as well as multiple trigger mechanisms 38. As can be seen in this embodiment (as well as in FIG. 5), it is contemplated that trigger mechanism guide 61 has five holes to accept and position five trigger mechanisms 38. However, any number of holes in trigger mechanism guide 61 can be utilized with a corresponding number of trigger mechanisms 38.

Also shown in FIG. 6A is trigger mechanism plate 71. As can be seen clearer in FIG. 6B, each punch pin from the respective trigger mechanism contacts trigger mechanism plate 71, and it is trigger mechanism plate 71 which applies force from the hammer springs and punch pin springs to blade tip 52 by way of the punch pins.

Operation of a shovel with an attachment mechanism with a plurality of trigger mechanisms is the same as described above with respect to a shovel with an attachment mechanism with a single trigger mechanism. In particular, the shovel is positioned on the ground and a user applies force on the foot pedals. This force moves each attachment mechanism in a downward direction, causing each punch pin spring to compress and each hammer spring to compress. Each punch pin spring and hammer spring compress because of the action of blade tips on the trigger mechanism plate. Upon compression of each hammer spring and each punch pin spring, the top of each punch pin slides into each recess of the hammers, thus expanding the hammer springs. The expansion of the hammer springs slightly forces blade further into the ground. After the punch pins are seated in the respective recess, the punch pin springs are expanded, forcing the punch pins in a downward direction to act on the trigger mechanism plate and thus the blade tip, thereby forcing the blade further into the ground. After this, the components of the trigger mechanisms return to their initial state.

It is to be understood that the present subject matter is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A shovel, comprising:
    a handgrip;
    a shaft having a proximal end and a distal end, the handgrip attached to the shaft at the proximal end;
    an attachment mechanism attached to the shaft at the distal end;
    a foot pedal attached to the attachment mechanism; and
    a blade attached to the attachment mechanism, the blade comprising a blade tip and a blade end,
    wherein the attachment mechanism comprises:
        a housing having an upper portion and a lower portion; and
        a triggering mechanism located within the housing, the triggering mechanism comprising:
            a hammer spring located in the upper portion of the housing;
            a hammer having a top portion and a bottom portion, wherein:
                the hammer is located in the upper portion of the housing,
                the top portion of the hammer abuts the hammer spring, and
                the bottom portion of the hammer includes a recess;
            a punch pin having a top and a bottom, wherein:
                the punch pin is located in the lower portion of the housing,
                the top of the punch pin contacts the bottom portion of the hammer adjacent to the recess, and
                the bottom of the punch pin contacts the blade tip; and
            a punch pin spring, wherein the punch pin spring is coiled around the punch pin.

2. The shovel according to claim 1, wherein the recess is configured to receive the top of the punch pin.

3. The shovel according to claim 1, wherein the housing further comprises a ledge, the ledge dividing the housing into the upper portion and the lower portion.

4. The shovel according to claim 1, wherein the attachment mechanism further comprises a return spring mounted outside of the lower portion of the housing.

5. A shovel, comprising:
- a handgrip;
- a shaft having a proximal end and a distal end, the handgrip attached to the shaft at the proximal end;
- an attachment mechanism attached to the shaft at the distal end;
- a foot pedal attached to the attachment mechanism; and
- a blade attached to the attachment mechanism, the blade comprising a blade tip and a blade end, wherein the attachment mechanism comprises:
- a housing;
- a triggering mechanism guide located within the housing and comprising a plurality of triggering mechanism holes;
- a triggering mechanism plate located within the housing and in contact with the blade tip; and
- a plurality of triggering mechanisms located within the housing and in the triggering mechanism holes of the triggering mechanism guide, each of the plurality of triggering mechanisms comprising:
  - a triggering mechanism housing having an upper portion and a lower portion;
  - a hammer spring located in the upper portion of the triggering mechanism housing;
  - a hammer having a top portion and a bottom portion, wherein:
    - the hammer is located in the upper portion of the triggering mechanism housing,
    - the top portion of the hammer abuts the hammer spring, and
    - the bottom portion of the hammer includes a recess;
  - a punch pin having a top and a bottom, wherein:
    - the punch pin is located in the bottom portion of the triggering mechanism housing,
    - the top of the punch pin contacts the bottom portion of the hammer adjacent to the recess, and
    - the bottom of the punch pin contacts the triggering mechanism plate; and
  - a punch pin spring, wherein the punch pin spring is coiled around the punch pin.

* * * * *